(12) United States Patent
Waye et al.

(10) Patent No.: US 7,024,157 B2
(45) Date of Patent: Apr. 4, 2006

(54) LOCAL AREA NETWORK COMPUTER SYSTEM UTILIZING RADIATING TRANSMISSION LINE

(75) Inventors: Patrick M. Y. Waye, Stouffville (CA); Arie Willem Kruger, Pretoria Gardens (ZA)

(73) Assignee: Mine Radio Systems Inc., Ontario (CA)

( * ) Notice: Subject to any disclaimer, the term of this patent is extended or adjusted under 35 U.S.C. 154(b) by 583 days.

(21) Appl. No.: 09/922,468

(22) Filed: Aug. 3, 2001

(65) Prior Publication Data

US 2002/0022451 A1 Feb. 21, 2002

(30) Foreign Application Priority Data

Aug. 4, 2000 (CA) .................................. 2315123

(51) Int. Cl.
*H04H 1/00* (2006.01)
(52) U.S. Cl. ................. 455/3.05; 455/522; 455/523; 455/282; 455/59; 455/402; 455/456.4; 455/338; 455/14; 455/15; 455/17; 370/235; 370/473; 370/477; 379/399.01; 379/399.02
(58) Field of Classification Search ............. 370/235, 370/473, 477, 464; 379/399.02, 399.01, 379/400; 455/59, 282, 456.4, 16, 17, 14, 455/15, 338, 402, 522, 523, 426.2, 3.05, 455/305
See application file for complete search history.

(56) References Cited

U.S. PATENT DOCUMENTS

| 697,067 | A | * | 4/1902 | Graham et al. | ............... 56/381 |
| 5,267,262 | A | * | 11/1993 | Wheatley, III | ............... 455/522 |
| 5,432,838 | A | * | 7/1995 | Purchase et al. | ............ 455/523 |
| 6,308,080 | B1 | * | 10/2001 | Burt et al. | ................... 455/522 |
| 6,330,455 | B1 | * | 12/2001 | Ichihara | ....................... 455/522 |
| 6,480,163 | B1 | * | 11/2002 | Knop et al. | .................. 343/770 |
| 6,504,636 | B1 | * | 1/2003 | Seto et al. | ...................... 398/91 |
| 6,621,812 | B1 | * | 9/2003 | Chapman et al. | ........... 370/346 |

* cited by examiner

*Primary Examiner*—Nay Maung
*Assistant Examiner*—Shaima Q. Aminzay
(74) *Attorney, Agent, or Firm*—Blakely Sokoloff Taylor & Zafman (57) ABSTRACT

A radio frequency communication system utilizing a radiating transmission line for communicating data signals is disclosed. The data signals convey digital data to remotely located data devices, including computers, equipment control systems and digital video cameras. The data signals have a wide bandwidth of about 0.5 MHz to 32 MHz. In this way, the communication system creates a local area network by means of the radiating communication line. The communication system is intended to be used in environments where radio waves do not propagate well, such as in underground environments, and in particular mines. The communication system comprises at least one amplifier connected to the radiating transmission line for periodically amplifying the data signals by demodulating the data signals to recover the data contained therein and then modulating the recovered data into a regenerated radio frequency at a power level permitting transmission and radiation of the regenerated radio frequency data signal. The regeneration amplifiers comprise a processor for temporarily storing and performing error detection and correction functions on the recovered data. The regeneration amplifiers also comprise a device for tracking the data devices within the coverage area of the regeneration amplifier. Information regarding the data devices within the coverage area of each regeneration amplifier is sent to a system server of the communication system and the system server utilizes this information to account for delays caused by the regeneration amplifier. The communication system may support cable modem protocols such as DOCSIS.

21 Claims, 6 Drawing Sheets

LOCAL AREA NETWORK COMPUTER SYSTEM UTILIZING RADIATING TRANSMISSION LINE

FIELD OF THE INVENTION

This invention relates to radio frequency communication systems, and in particular radio frequency communication systems utilizing radiating or "leaky" transmission lines. More particularly, the present invention relates to a radio frequency communication system for use in underground communication systems to transmit data signals.

BACKGROUND OF THE INVENTION

Radiating transmission lines are deliberately constructed as imperfect transmission lines so that signals in the inner conductor radiate electromagnetic fields outwardly from the line as the electrical signals are being transmitted down the line. The electromagnetic fields radiated from the line can be picked up by mobile receivers located remotely, but in the vicinity, of the line.

Radiating transmission lines can take on several different forms. One form comprises an open braid coaxial cable. Other forms comprise coaxial cables having cylindrical outer sheaths with longitudinal slits to permit radiation.

Radiating transmission lines are commonly used in environments where electromagnetic waves, such as radio frequency waves, do not propagate well. This type of environment exists, for example, in underground environments, such as mine shafts. For example, a worker in a mine shaft using a remote mobile audio device, such as a walkie-talkie, cannot communicate with other workers who also have remote mobile audio stations, because the radio waves cannot propagate long distances down a mine shaft. However, if all of the workers were near a radiating transmission line such that the radio waves from the first worker's audio device could be received by the transmission line, those signals could be transmitted down the line to a head end unit and then re-transmitted down the wire and radiated near the audio devices of other workers. In this way, communication in the mine shaft can be effected.

As underground mines become more sophisticated and utilize electronic devices and machinery of ever more increasing complexity, there is a need to communicate large amounts of data, as well as audio signals, to remotely located data devices within the underground environment. For example, several underground monitoring devices that monitor the location of personnel and machinery require large amounts of data to be transmitted reliably. Furthermore, control of equipment or large machinery requires the ability to transmit large amounts of digital data to and from the underground environment for both monitoring and controlling the machinery. In addition, many of these electronic devices are designed to operate based on specific protocols, and, it is necessary that the data signals satisfy these protocols.

Furthermore, as remote mining increases, more personnel are operating machinery remotely from the surface or designated areas. In these situations, it is necessary for workers located remotely from the mine to be able to visually monitor the activities within the mine, such as by means of digital video cameras. The digital data signals generated by digital video cameras must then be transmitted to the remotely located personnel.

It is also apparent that because of the nature of a mining environment, the equipment and the personnel must be mobile to progress with the substance, such as ore or coal, being mined. Therefore, at least for this reason, a permanent connection to a communication line is not practical. Rather, ever increasing amounts of data must be transmitted through and radiated from the radiating transmission lines.

In order to transmit larger amounts of data in an underground environment, it is generally necessary to increase the bandwidth of the signals being transmitted and radiated from the radiating transmission lines. However, as the bandwidth increases, there is a corresponding increase in the power required to radiate the signal. This is the case because there is a constant power requirement to radiate each additional Hz of bandwidth. In other words, the ratio of "power" to "Hz or cycles of bandwidth" remains constant such that when the bandwidth is increased, there is a corresponding increase in power required to radiate the signal.

Heretofore, signals along the radiating transmission line have been amplified periodically to boost the signal and also improve the radiating characteristics of the signal. However, these types of amplification units generally involve an operational amplifier or a transistor that linearly amplifies the signal. Unfortunately, while these types of linear amplifiers may be used once or twice to amplify wide band data signals, these amplifiers generally cannot amplify a signal having a wide bandwidth sufficiently to propagate the signal through the radiating transmission line an appreciable distance. This is the case, in part, because these types of linear amplifiers amplify not only the signal but also the noise. Even if filters are utilized to filter the signal before and after amplification, there will be an ever increasing noise to signal ratio because of the gain of the amplifier and the increased power level of the signal.

Accordingly, there is a need in the art for a communication system utilizing a radiating transmission line that can communicate data signals to remotely located and mobile data devices similar to a local area network (LAN) while complying with existing protocols used by the data devices. There is also a need for a radiating transmission line communication system that can transmit data signals having a wider bandwidth. Furthermore, there is a need in the art for an amplifier that can reliably amplify a wide bandwidth signal while decreasing amplification and propagation of noise.

SUMMARY OF THE INVENTION

Accordingly, it is an object of this invention to at least partially overcome the disadvantages of the prior art. Also, it is an object of this invention to provide an improved type of radio frequency communication system which provides for communication of data signals to remotely located data devices. Also, it is an object of the present invention to provide an amplifier for use in a radio frequency communication system utilized in association with a radiating transmission line which can amplify wide bandwidth data signals while decreasing the propagation of noise.

Accordingly, in one of its aspects, this invention resides in a radio frequency communication system for communicating radio frequency data signals containing data to and from remotely located data devices, said system comprising: a radiating transmission line; a head end unit comprising a system server, said head end unit being coupled to a first end of the radiating transmission line; at least one regeneration amplifier connected to said transmission line for amplifying the data signals by demodulating the data signals to recover the data contained therein and modulating the recovered data into a regenerated radio frequency data signal containing the recovered data; wherein the regenerated data signal is transmitted through the radiating transmission line at a power level permitting transmission and radiation of the regenerated radio frequency data signal to the remotely located data devices within a coverage area of the regeneration amplifier.

In a further aspect, this invention resides in a radio frequency communication system for communicating radio frequency data signals containing data to and from remotely located data devices through a radiating transmission line, a regeneration amplifier for amplifying the digital signals through the radiating transmission line, said regeneration amplifier comprising: a demodulator for demodulating the data signals to recover the data contained therein; a modulator for modulating the recovered data into a regenerated radio frequency data signal containing the recovered data; an amplifier for amplifying the regenerated data signal for transmission through the radiating transmission line at a power level permitting transmission and radiation of the regenerated radio frequency data signal to the remotely located data devices within a coverage area of the regeneration amplifier.

One advantage of the present invention is that by use of a regenerating amplifier, the data signals cannot just be amplified, but regenerated. This results in a much stronger signal than would otherwise be present with just amplification, such as through a linear amplifier. Furthermore, demodulating the signal and then modulating a regenerated signal will remove any noise which may have crept into the signal during the transmission.

A further advantage of the present invention is that because the data signal is being demodulated, a processor can be used to perform error detection and correction functions on the data prior to modulating the regenerated signal. In this way, the data can be analyzed for errors and the errors corrected periodically while the data signals are being transmitted through the radiating transmission line. This increases the reliability of the communication system, and, decreases the noise which may creep into the data signal as it is being transmitted. Furthermore, if the data signal is so corrupted that the errors cannot be corrected, a signal can be returned to the head end unit to cause a retransmission of the data signal early on, and, before the corrupted data signal has passed through several amplifiers and regeneration amplifiers in the communication system.

In a further aspect, the present invention provides the ability to detect the number of regeneration amplifiers a signal must pass through before reaching the target data device. In this way, the system server for the radio frequency communication system can monitor and account for delays associated with the regeneration amplifiers, and error detection and correction function of the regeneration amplifiers. This permits the communication system to be adapted to comply with existing cable modem protocols and timing, such as the Data Over Cable Service Interface Specification (DOCSIS). In this way, existing modems and software can be utilized for the data devices in the mine, thereby avoiding the need for customized modem and electronics for the data devices, and, resulting in a corresponding decrease in the overall cost and complexity of the communication system.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1A:
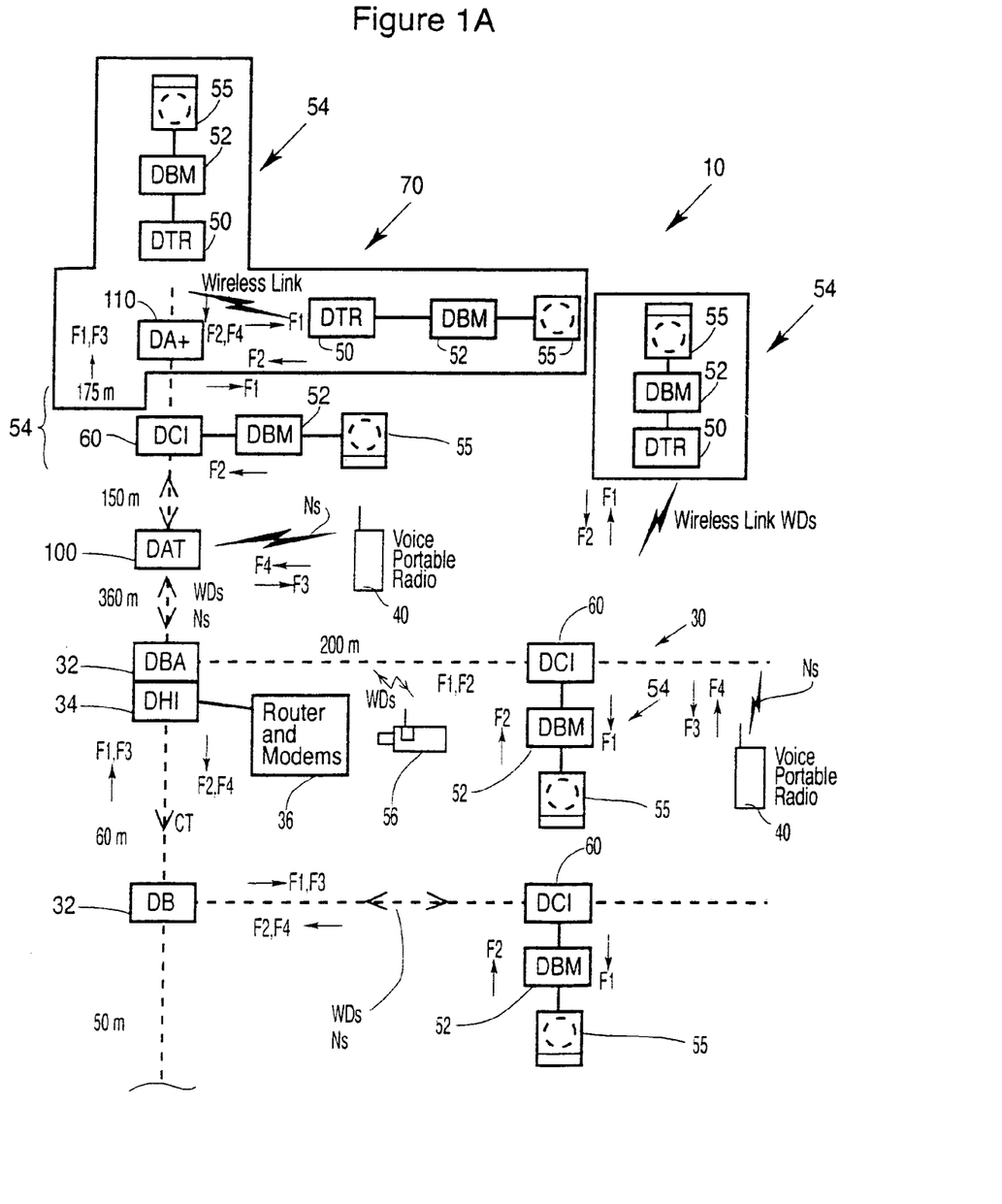
FIGS. 1A and 1B is a symbolic drawing illustrating a communication system according to one embodiment of the present invention.
Figure 1B:
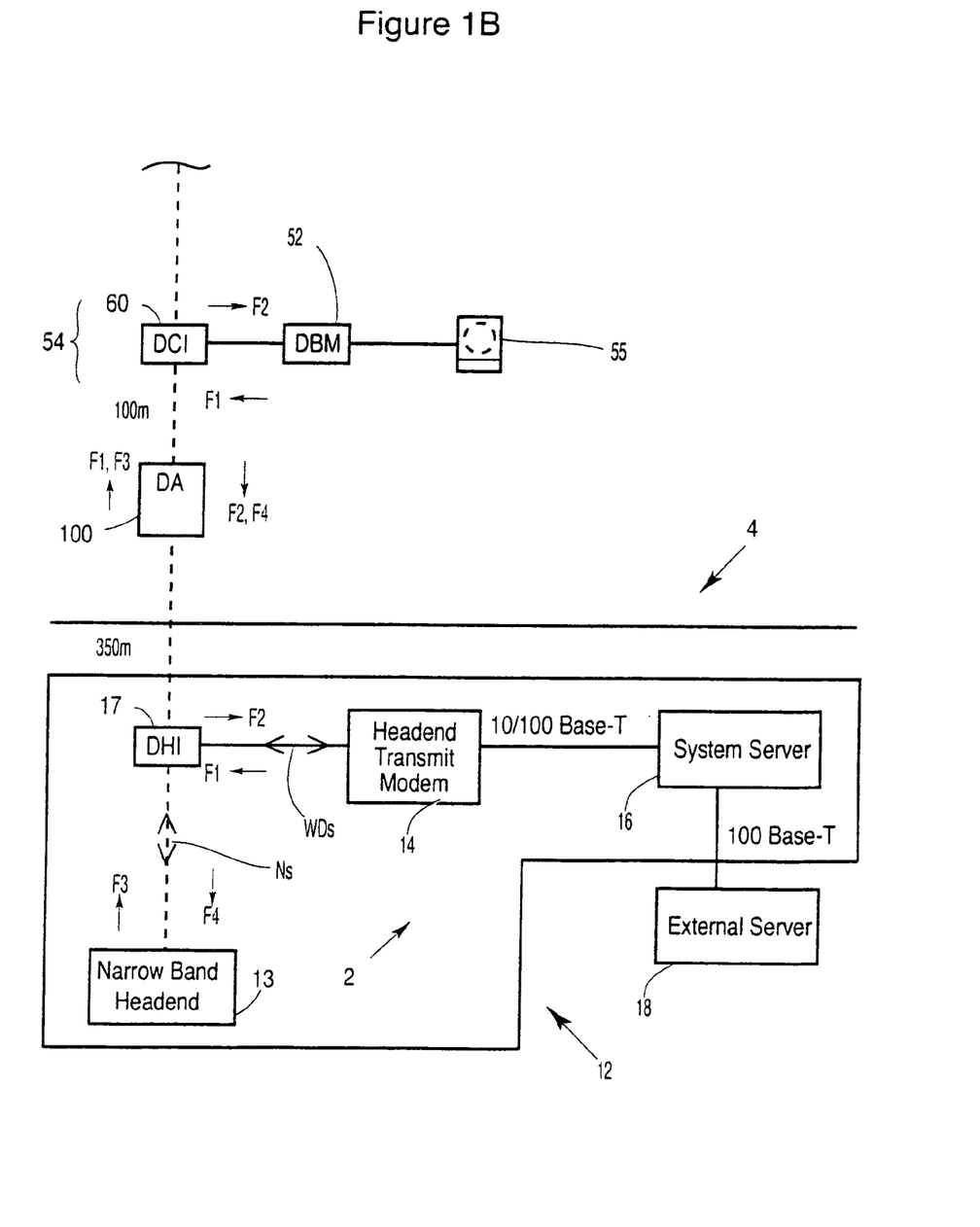

FIGS. 1A and 1B illustrate the data communication system, shown generally by reference numeral 10, according to one embodiment of the present invention. As illustrated in FIGS. 1A and 1B, the communication system 10 is preferably designed to be used in an environment where radio frequencies signals do not propagate well, such as in an underground environment. For example, as illustrated in FIGS. 1A and 1B, a portion of the communication system 10 is located below ground, shown generally by reference numeral 4, and a portion of the communication system is located above ground, shown generally by reference numeral 20, ground level being shown by reference numeral 2.

For purposes of illustration, FIGS. 1A and 1B show the radio frequency communication system 10 to be installed in a mine. In this case, a substantial part of the communication system 10 is located below ground 4. However, it is understood that the communication system 10 can be used in any underground environment, including in underground construction environments, such as construction of a tunnel.

As shown in FIGS. 1A and 1B, the communication system 10 comprises a head end unit 12 located above ground 20. The head end unit 12 comprises a narrow band head end unit 13 for sending and receiving narrow band signals, shown generally by reference numeral Ns. The narrow band signals Ns are generally sent and received at frequencies F3 and F4, as illustrated in FIGS. 1A and 1B and as described in more detail below.

The head end unit 12 also comprises a system server 16 for manipulating data which is to be received from and sent below ground 4. The system server 16 can be any type of server which may perform this function. The data from the system server 16 is sent to a head end transmit modem 14 which modulates and demodulates the data to form data signals, shown generally by reference numeral WDs. The data signals WDs are generally wide band electromagnetic signals, having a bandwidth of between 0.5 MHz to 32 MHz, and, are generally sent and received at frequencies F1 and F2.

In this way, the modulator 14 can modulate and demodulate data signals WDs containing digital data from the server 16. The digital data contained in the data signals WDs can be retransmitted data obtained from different data devices, shown generally by reference numeral 54, below ground 4.

The digital data contained in the data signals WDs can also be obtained from external environments, such as the external server 18.

It is understood that the external server 18 can be any type of external computing device. It is also understood that the system server 16 and/or the external server 18 can be connected to other networks, including intranetworks of a company, such as a mining company, or the Internet. In this way, the wide band data signals WDs being transmitted and received below ground 4 may have originated either from below ground 4 or from any other locations. It is also understood that the system server 16 and/or the external server 18 could be connected to another server (not shown) operating below ground 4 at another geographical location, thereby permitting communication of data from one communication system 10 located below ground 4 in one location to another communication system 10 located below ground 4 in another geographical location.

The head end unit 12 also comprises a head end interface 17 for interfacing the head end unit 12 with a radiating transmission line, shown generally by reference numeral 30. The radiating transmission line 30 is of the type referred to above where electromagnetic signals are both transmitted and radiated from the radiating transmission line 30. The head end interface 17 interfaces both the narrow band signals Ns from the narrow band head end 13 and the wide band signals WDs from the transmit modem 14 to the radiating transmission line 30. In this way, the wide band data signals WDs and the narrow band signals Ns can be transmitted and radiated below ground 4.

The narrow band signals Ns are generally received by the remotely located portable devices 40, such as radios, also commonly known as "walkie-talkies", located in the vicinity of the radiating transmission line 30. The radios 40 comprise transceivers and modulators/demodulators for receiving and sending narrow band signals Ns at the third and fourth frequencies F3 and F4, respectively, as is known in the art.

The wide band data signals WDs are generally received by remotely located data devices 54. In one embodiment, data devices 54 comprise a modem, shown by symbol DBM and reference numeral 52, a transceiver, shown by symbol DTR and reference numeral 50 and a device which can utilize the signals WDs, such as a computer 55. The modem 52 modulates and demodulates data signals WDs to and from the computer 55. The transceiver 50 receives and transmits the wide band data signals WDs to and from the radiating transmission line 30 at the first and second frequencies F1 and F2, respectively.

It is understood that the data device 54 can comprise a computer 55 to control and/or monitor equipment below ground 4, convey information to personnel below ground 4, or perform any other function. In other words, the data devices 54 may comprise computers 55 such that a local area network (LAN) is formed below ground 4. In addition, the data device 54 can comprise a device, such as a mobile message unit to send and receive electronic mail, in which case the data device 54 would likely comprise the modem 52 and transceiver 50 in a single unit. The data device 54 could also be a computer 55 located on a vehicle (not shown) for transporting people and equipment below ground 4, in which case the computer 55 may send and receive data regarding the personnel on board and the position and status of the vehicle (not shown).

The data device 54 may, in one embodiment, comprise an electronic device, such as a digital video camera 56. In this case, the digital video camera 56 may send and receive the wide band data signals WDs representing images being viewed by the camera 56. The data device 54 may also comprise digital audio devices (not shown) such as digital telephones, permitting audio signals to be transmitted as wide band data signals WDs.

In addition to the data devices 54 which send and receive the wide band data signals WDs through a wireless transceiver 50, the communication system 10 also comprises data devices 54 which are releasably connected through a direct connect interface, shown by symbol DCI and reference numeral 60, to the radiating transmission line 30. The interface 60 can releasably and temporarily interface a data device 54 at a specific location along the radiating transmission line 30. However, the data device 54 can be periodically disconnected from the radiating transmission line 30 and then re-connected at another location, thereby giving the data devices 54 which utilize the interface 60 some mobility below ground 4.

The communication system 10 also comprises branching units, shown by reference numerals DB and DBA and reference numeral 32. The branching units 32 permit the radiating transmission line 30 to be "branched-off" into different directions. In the situation where the communication system 10 is installed in a mine, the branching unit 32 will allow the radiating transmission line 30 to extend down a shaft and also horizontally along different levels. For example, in the case where the system 10 is installed in a mine, the vertical extension of the radiating transmission line 30 would go down a mine shaft and each horizontal extension of the radiating transmission line 30, as occurs at a branching unit 32, would go down a different level of the mine.

In one embodiment, a head end interface, shown generally by symbol DHI and reference numeral 34, being connected to a router and modems 36 can be inserted anywhere in the system. The head end interface 34 and router and modems 36 can comprise a separate redundant connection to the head end unit 12. The separate redundant connection is not illustrated in FIGS. 1A and 1B, but is described in U.S. Pat. No. 5,669,065.

The communication system 10 further comprises linear amplifiers, shown generally by symbol DA and reference numeral 100, as well as regeneration amplifiers, shown generally by symbol DA+ and reference numeral 110. The linear amplifiers 100 comprise filters and a linear amplifier to amplify the narrow band signals Ns. In one embodiment, it may also amplify the wide band signals WDs. The linear amplifier may comprise an operational amplifier (not shown) or a transistor. An example of this type of linear amplifier is disclosed in U.S. Pat. No. 5,697,067.

The regeneration amplifiers 110 are used primarily for the wide band data signals WDs. The regeneration amplifiers 110 are spaced further along in the communication system 10, such as every 500 to 10,000 meters. The regeneration amplifiers 110 are connected to the radiating transmission line 30 and amplify the wide band data signals WDs by demodulating the data signals WDs to recover the data contained therein and then modulating the recovered data into regenerated radio frequency data signal WDR. It is understood that a new regeneration signal WDR will be regenerated each time the wide band data signal WDs passes through a regeneration amplifier 110.

The regeneration amplifier is intended to amplify the wide band data signals WDs more so than the linear amplifiers 110. In part, the regeneration amplifier 110 accomplishes this by regenerating the wide band data signal as a regenerated wide band signal WDR at a higher power level. Furthermore, demodulating and then remodulating a data signal WDs assists in removing any noise which may have crept into the wide band data signal WDs during transmission.

Figure 2:
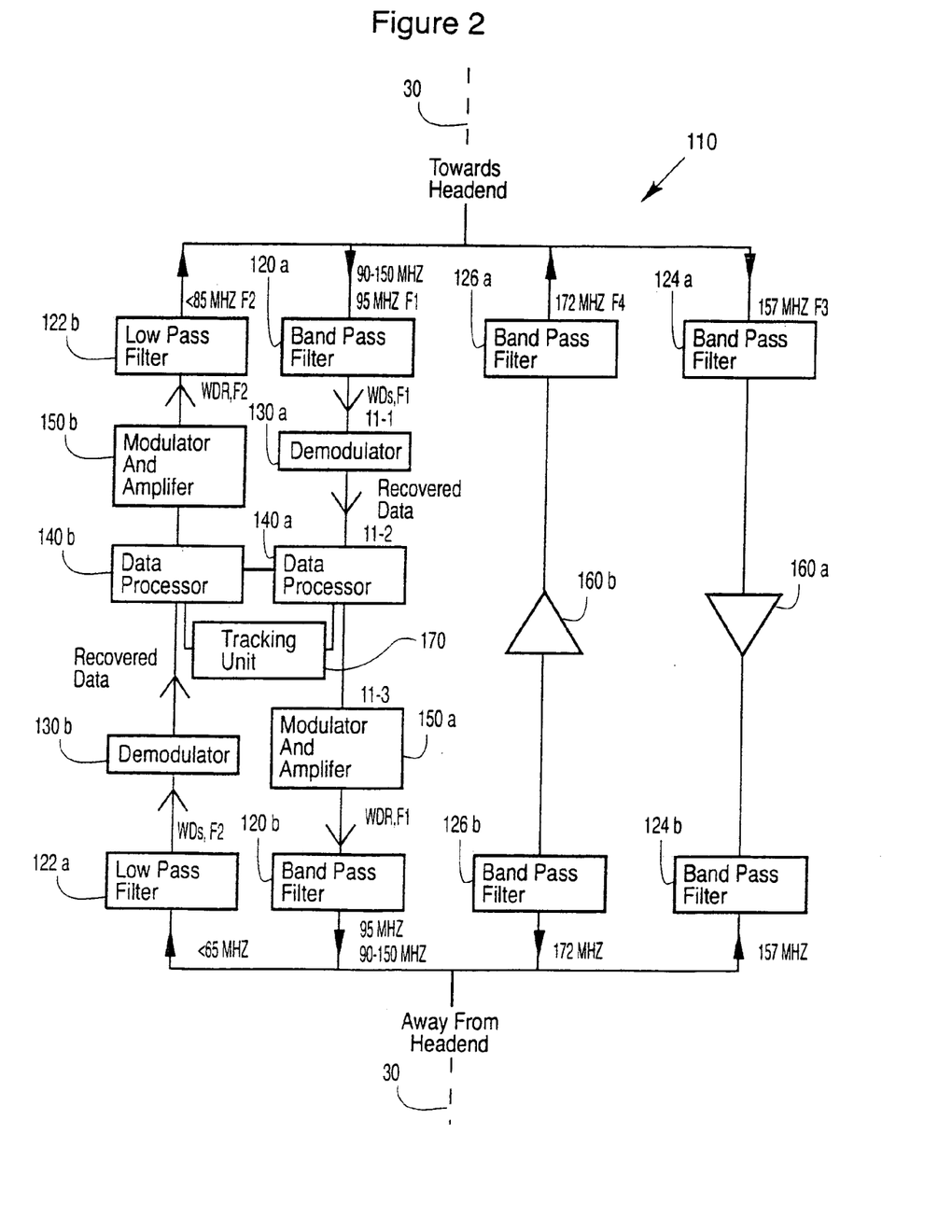
FIG. 2 is a schematic drawing illustrating a regeneration amplifier according to one embodiment of the present invention.

FIG. 2 illustrates a schematic diagram of a regeneration amplifier 110 according to one embodiment of the present invention. As shown in FIG. 2, the regeneration amplifier 110 comprises first band pass filters 120a and 120b which are used to filter out signals having the first frequency F1. As illustrated in FIG. 2, in a preferred embodiment, the first frequency F1 will be between 90 MHz and 150 MHz, and more preferably 95 MHz. Likewise, the regeneration amplifier 110 will comprise second band pass filters 122a, 122b for filtering wide band data signals WDs having the second frequency F2. In the embodiment illustrated in FIG. 2, the second frequency F2 will have a frequency of less than 65 MHz. Therefore, the second band pass filters 122a, 122b may simply be low-pass filters for filtering signals having a frequency less than 65 MHz.

The regeneration amplifier 110 further comprises a first demodulator 130a and a second demodulator 130b. The demodulators 130a, 130b will demodulate the wide band data signals WDs having the first frequency F1 and the second frequency F2 in order to recover the data contained therein. The first and second demodulators 130a, 130b are shown to be at opposite ends of the regeneration amplifier 110 in view of the fact that the wide band data signals WDs having the first frequency F1 will be travelling away from the head end unit 12 and the wide band data signals WDs having the second frequency F2 will be travelling towards the head end unit 12, as illustrated in FIGS. 1A and 1B and 2.

The regeneration amplifier 110 also comprises data processors 140a, 140b. While two data processors are illustrated in FIGS. 1A and 1B, it is understood that a single data processor 140 could be connected and utilized for the wide band data signals WDs having the first frequency F1 and the second frequency F2. The data processor 140 stores the recovered data periodically until the recovered data is to be sent to the first and second modulator and amplifier 150a, 150b.

While the recovered data is stored in the data processor 140, error detection and correction functions may be performed on the recovered data by the data processors 140. The error detection and correction functions can be a standard type of function used to detect and, if possible, correct errors in the recovered data. In a preferred embodiment, the data processors 140 may retain the packets of data for one cycle in order to receive the immediately following packet of data. The error detection and correction functions can then be performed on the two packets of data, using standard error correction and detection functions.

If an error is detected in the recovered data which cannot be corrected, the processors 140 will send a signal to the system server 16 indicating that a packet of data has been received and an error that cannot be corrected has been detected. The system server 16 will then perform appropriate functions in order to have the data re-sent.

As stated above, the regeneration amplifier 110 also comprises a first modulator and amplifier 150a and a second modulator and amplifier 150b. The first and second modulators and amplifiers 150a, 150b remodulate the recovered data to create regenerated wide band data signals WDR having the first frequency F1 and the second frequency F2, respectively. The regenerated wide band data signals WDs having the first frequency F1 will continue travelling in a direction away from the head end unit 12 and at a much higher power level than when the wide band data signals WDs entered the regeneration amplifier 110. In particular, the wide band data signals WDs having the first frequency F1 will have a power level sufficient to radiate from the radiating transmission line 30 and be received by data devices 54 having transceivers 52 and located in the vicinity or coverage area 70 of the regeneration amplifier 110.

Likewise, the wide band data signals WDs having the second frequency F2 will be remodulated by the second modulator and amplifier 150b to form the regenerated wide band data signal WDR having the second frequency F2. The regenerated wide band data signal WDR having the second frequency F2 will then continue travelling in the direction towards the head end unit 12.

The first and second modulator and amplifiers 150a, 150b will likely be combined, as illustrated in FIG. 2. However, it is understood that the regeneration amplifier 110 may have separate circuits to modulate and then amplify a regenerated signal WDR.

The regenerated wide band signals WDR should have the same characteristics as the wide band data signals WDs which entered the regeneration amplifier 110, but be at a higher power level. Accordingly, the symbol WDR will be used in FIG. 2 to identify the regenerated data signals WDR, but in FIGS. 1A and 1B, all of the wide band data signals are identified by reference numeral WDs reflecting that the regenerated and originally generated data signals WDR, WDS are substantially indistinguishable.

The regeneration amplifier 110 also comprises third band pass filters 124a and 124b for filtering signals having the third frequency F3. As is apparent from FIGS. 1A and 1B, the narrow band signals Ns will have the third frequency F3 and travel away from the head end unit 12. In addition, the regeneration amplifier 110 will comprise a linear amplifier 160a for amplifying the narrow band signal Ns having a third frequency F3 and travelling away from the head end unit 12.

As illustrated in FIG. 2, preferably the third frequency F3 will be about 157 MHz and the fourth frequency F4 will be about 172 MHz. However, it is understood that any type of appropriate frequencies can be utilized. Generally, a radiating transmission line 30 according to the present technology can best transmit radio frequency signals having a frequency of between 0 and 200 MHz, however, it is understood, a wider frequency range may be used in the future or with improved types of radiating transmission lines 30.

Likewise, data devices 54 having a direct connection interface 60 to the radiating transmission line 30 will also receive the wide band data signals WDs having the first frequency F1. In both cases, the modem 52 will demodulate the wide band data signals WDs and recover the data for use by the data device 54, such as the computer 55.

In operation, the communication system 10 operates such that the wide band data signals WDs having the first frequency F1 travelling into the mine and away from the head end unit 12. Furthermore, the wide band signals WDs having the first frequency F1 will have a sufficient power level so that they can radiate from the radiating transmission line 30 and be received by data devices 54 having a transceiver 50, as well as data devices 54 connected to the line 30 by an interface 60. Likewise, the regeneration amplifier 110 will comprise fourth band pass filters 126a, 126b for filtering narrow band signals Ns having the fourth frequency F4. The regeneration amplifier 110 will also comprise a second linear amplifier 160b for amplifying the narrow band signals Ns having the fourth frequency F4 and travelling towards the head end unit 12.

Furthermore, narrow band signals Ns having the third frequency F3 will travel into the mine and away from the head end unit 12. The narrow band signals Ns having the third frequency F3 will be received by portable radios 40 near the radiating transmission line 30.

The data devices 54 send packets of data to the system server 16 by sending data through the modems 52 modulated at the second frequency F2. In this way, wide band data signals WDs having a second frequency F2 will emanate from the data devices 54 and travel through the radiating transmission line 30 back to the system server 16. In a similar manner, the radios 40 will generate narrow band signals Ns having the fourth frequency F4 which will travel along the radiating transmission line 30 back to the narrow band head end 13.

Accordingly, it is apparent that, in a preferred embodiment, only the wide band data signals WDs having the first frequency F1 need radiate from the radiating transmission line 30. In other words, the wide band data signals WDs having the second frequency F2 need not radiate from the radiating transmission line 30, and therefore may be at a lower power level. Similarly, the narrow band signals having the fourth frequency F4 need not radiate from the radiate transmission line 30, and therefore may have a lower power level than the narrow band signals Ns having the third frequency F3.

From the above, it is apparent how the wide band and narrow band signals Ns, WDs will be communicated from above ground 20 to below ground 4. In order to communicate information between data devices 54 below ground 4, one data device 54 initially sends a packet of data as a wide band data signal WDs at the second frequency F2 to the head end unit 12. Then, the head end unit 12 will retransmit the same signal contained in the signal packet of data as a wide band data signal WDs at the first frequency F1 below ground 4, generally as a packet of data having a header identifying the target data device 54 to which the data 13 is intended. In this way, a packet of data from one data device 54 can be sent to a target data device 54 where both data devices 54 are below ground 4. Communication between portable radios 40 can be effected in a similar fashion using narrow band signals Ns at the third and fourth frequency.

As illustrated in FIG. 2, the regeneration amplifier 110 preferably comprises a tracking unit 170. The tracking unit 170 tracks the data devices 54 within a coverage area, shown by reference numeral 70 in FIGS. 1A and 1B, of the regeneration amplifier 110. The coverage area 70 represents the area of the communication system 10 within which wide band data signals WDs which are originally generated by a data device 54 can be sent and received from the regenerating unit 110. In other words, the coverage area 70 does not include data devices 54 located further below ground 4 and which have wide band data signals WDs which have been previously regenerated by another regenerating amplifier 110.

The tracking unit 170 is shown as being a separate unit in FIG. 2, however, it is understood that the tracking unit 170 can form part of the processor 140. In either case, the tracking unit 170 must have access to the first demodulator 130a in order to be able to send control signals, shown by symbol CT in FIGS. 1A and 1B, to the system server 16. The tracking unit 170 sends control signals CT which represent information regarding the data devices 54 within the coverage area 70 of the regeneration amplifier 110.

The control signal CT regarding the data devices 54 within the coverage area 70 of each regeneration amplifier 110 in the communication system 10 is received by the system server 16 and used by the system server 16 to account for delays caused by each regeneration amplifier 110. In one embodiment, the system server 16 comprises a topology of the system 10. The system 10 can then determine the location of the amplifier 110 which sent the control signal CT and calculate the number of regenerations to the regeneration amplifier 110. In another embodiment, the control signal CT is modified each time it passes through a regeneration amplifier 110 so that the control signal CT itself indicates to the system server 16 the number of regenerations.

The delay associated with regeneration amplifier 110 may result from several factors. For example, each time a wide band data signal WDs having the first frequency F1 is demodulated by a first demodulator 130a, a small time delay may occur. Furthermore, if the data processor 140a performs error detection and correction functions, this will introduce a much larger delay. In general, where the wide band data signals WDs are transmitting packets of data, the error detection and correction functions of the data processor 140a will introduce at least one data packet's time delay. This results, in part, from the data processor 140a waiting for receipt of an immediately next packet of data to perform the error correction and detection function. After the processor 140a performs the error detection and correction function, the modulator and amplifier unit 150a will then modulate and amplify the regenerated data signals WDR at the first frequency F1, which will introduce a further time delay.

Accordingly, there will be at least one data packet's time delay for each regeneration amplifier 110 that must regenerate a wide band data signal WDs at the first frequency F1 travelling away from the head end unit 12. Likewise, the data device 54 which receives the wide band data signal WDs from the head end unit 12 will return an acknowledgement signal to acknowledge receipt of the packet of data. The acknowledgement signal comprises a wide band data signal WDs at the second frequency F2 and will return along the same path as the wide band data signal WDs having the first frequency F1. Therefore, the wide band data signal WDs having the second frequency F2 will encounter the same number of regeneration amplifiers 110 as was encountered by the wide band data signal WDs having the frequency F1. Therefore, the delay seen by the system server 16 from the time a wide band data signal WDs having the first frequency F1 is sent below ground 4 to the time an acknowledgement signal is received, will be at least two data packets time delay for each regeneration amplifier 110 located between the head unit 12 from the data device 54.

Many of the data devices 54 are designed to receive and send packets of data pursuant to standard protocols. In a preferred embodiment, the communication system 10 utilizes the DOCSIS system. In order to comply with the DOCSIS system, the system server 16 must be aware of the delay caused by the regeneration amplifier 110 to regenerate the wide band data signal WDs having the first frequency F1 travelling away from the head end unit 12, and, the wide band data signal WDs having the second frequency F2 comprising the acknowledgement signal from the data device 54. At least for this reason, the system server 16 preferably has information regarding the data devices 54 within the coverage area 70 of each regeneration amplifier 110 in the communication system 10.

In a preferred embodiment, each data device 54, as well as each regeneration amplifier 110, has a unique address which can be used by the elements in the communication system 10 in order to identify the data device 54 and regeneration amplifier 110. In this embodiment, the tracking unit 170 tracks the data devices 54 within their area of coverage 70 by interrogating the data devices 54 within the coverage area 70.

After the regeneration amplifier 110 has determined the unique address of the data devices 54 within their coverage area 70, the regeneration amplifier 110 will send the control signal CT to the system server 16. In this embodiment, the control signal CT will comprise the unique address for the regeneration amplifier 110 sending the control signal CT, as well as the unique addresses of each data device 54 within the coverage area 70 of the regeneration amplifier 110.

Preferably, this control signal CT is generated and sent periodically, such as every minute, and more preferably, every one to two seconds. This permits the system server 16 to dynamically track each data device 54 which can communicate through the communication system 10. In this way, should a data device 54 be moving below ground 4, such as if the data device 54 is located on a vehicle (not shown) moving within a mine, the system server 16 can quickly determine when the data device 54 has changed from the area of coverage 70 of one regeneration amplifier 110 to the area of coverage 70 of another regeneration amplifier 110, and thereby account for the data delay quickly and with a minimum of interruption and transmission of the wide band data signals WDs.

In a further preferred embodiment, the tracking unit 170 within each regeneration amplifier 110 can track the data devices 54 within its coverage area 70 in order to send wide band data signals WDs directly between data devices 54 within its coverage area 70. In a preferred embodiment, this is accomplished by the tracking device 170 monitoring the data signals WDs being received from data devices 54 within its area of coverage 70. The tracking unit 170 can then determine which packets of data are being sent to another data device 54 within the same coverage area 70 by comparing the unique addresses of the data device 54 sending the wide data signals WDs and the unique address of the target data device 54 to which the wide band data signal WDs is destined to the unique address accumulated by the tracking unit 170.

For example, the data device 54 will send wide band data signals WDs at the second frequency F2 which will be received by the second demodulator 130b. The second demodulator 130b will recover the data from this data signal WDs, which data should include the unique address of the sending tracking device 54 and the target tracking device 54. If both the target data device 54 and the sending data device 54 have unique addresses which the tracking unit 170 determines falls within its coverage area 70, the tracking unit 170 may send the recovered data from data processor 140b to data processor 140a. The recovered data will then travel back through the first modulator 150a regenerated at the first frequency F1 and travel away from the head end unit 12 to be received by the target data device 54.

In a preferred embodiment, the unique address is similar to an Internet protocol address and can be used within the communication system 10 to identify and route the wide band data signals WDs in the form of packets of data having a header identifying the data device 54 by this address. In a further preferred embodiment, each data device 54 may be addressable through the Internet by its Internet protocol address.

Figure 3:
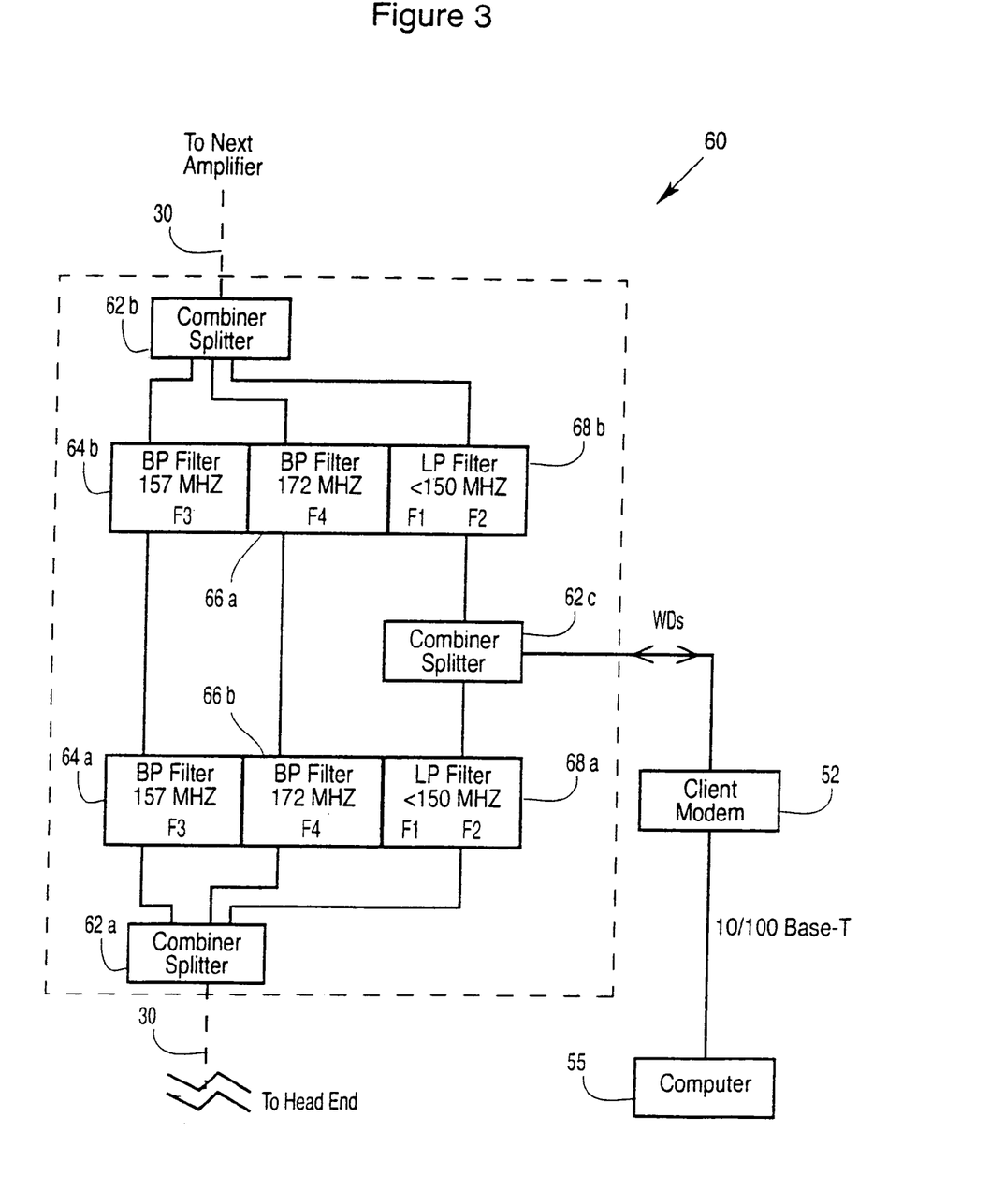
FIG. 3 is a schematic drawing illustrating a direct connection interface unit for interfacing a data device with the radiating transmission line according to one embodiment of the present invention.

FIG. 3 shows a schematic diagram of a direct connection interface 60 for a data device 54 which does not have a transceiver 50. As shown in FIG. 3, the interface 60 comprises a combiner/splitter 62a which splits the signals from the radiating transmission line 30 into three separate lines. Each of the three lines will go to a band pass filter 64a, 66a, 68a. Band pass filters 64a, 64b filter out the narrow band signals Ns having the third frequency F3, which in this embodiment is 157 MHz, and travelling away from the head end unit 12. Filters 66a, 66b filter out the narrow band signals Ns having the fourth frequency F4, which in this embodiment is 172 MHz, travelling towards the head end unit 12. Filters 68a, 68b are low-pass filters which permit passage of signals having a frequency less than 150 MHz, which corresponds to the band range for the first frequency and second frequency F1, F2, respectively, of the wide band data signals WDs in this preferred embodiment. The interface 60 also comprises a combiner/splitter in between the low-pass filter 68a, 68b for combining the wide band signals WDs coming from the computer 55 with the wide band data signals WDs coming into the interface 60, both away from and towards the head end unit 12.

Figure 4:
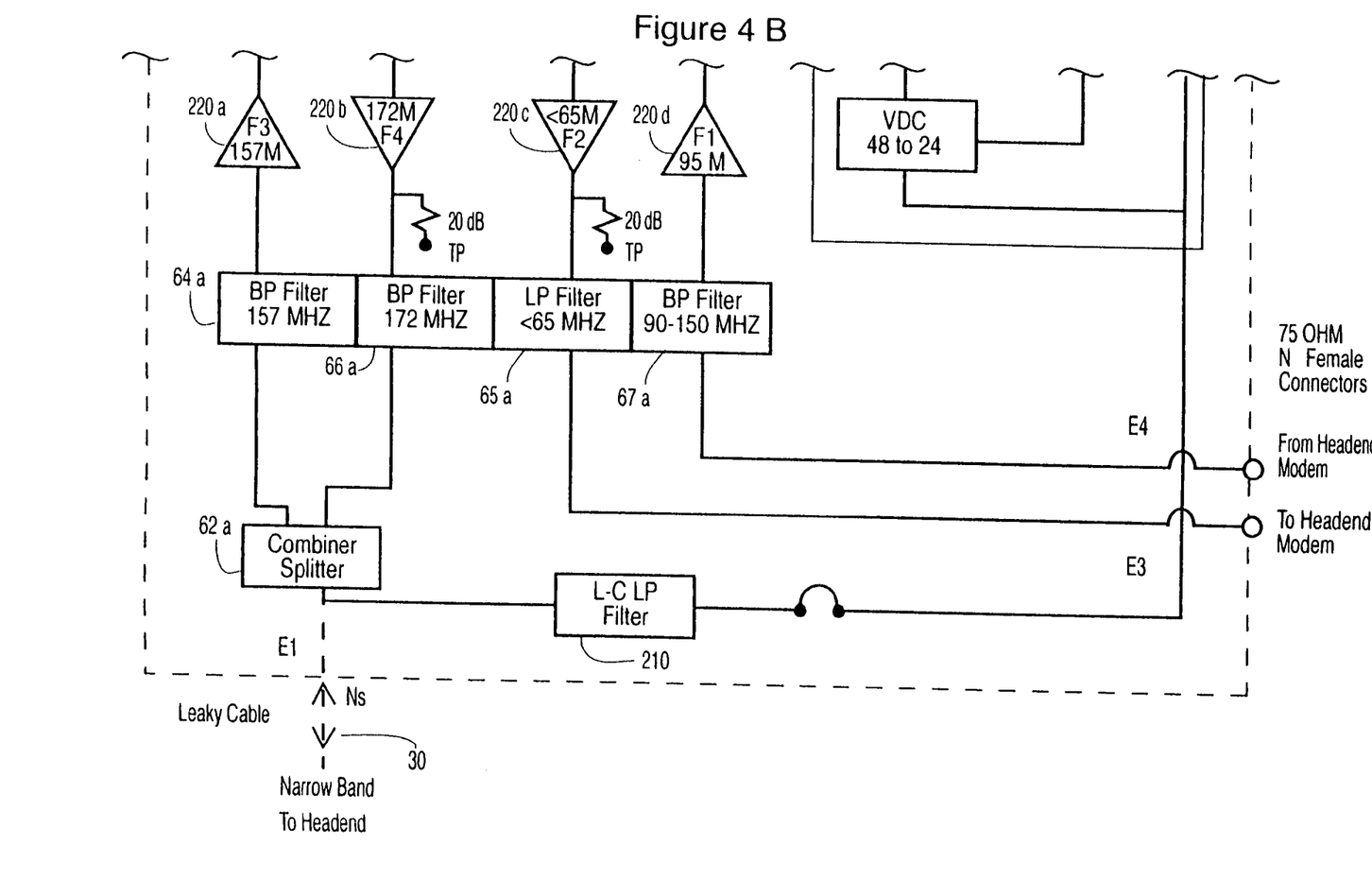
FIGS. 4A and 4B is a schematic drawing illustrating a head end interface unit according to one embodiment of the present invention.
Figure 4A:
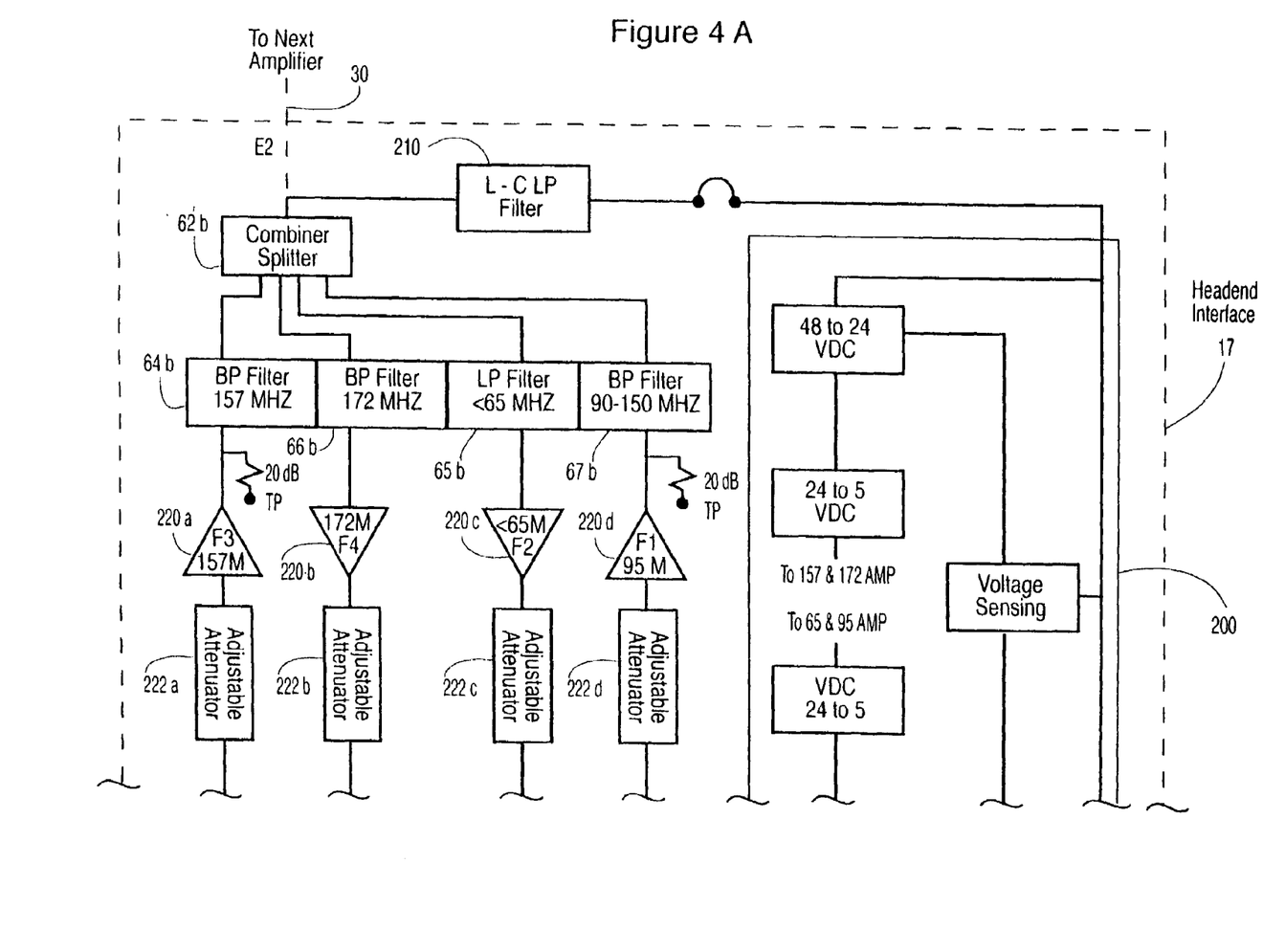

FIGS. 4A and 4B are a schematic diagram of the head end interface 17 to interface the head end unit 12 to the radiating transmission line 30. As shown in FIGS. 4A and 4B, the head end interface 17 comprises combiners/splitters 62a, 62b for combining and splitting separate lines between the radiating transmission line 30 and the band pass filter 64a, 64b, 66a, 66b and 65a, 67a, 65b, 67b. The band pass filters 64, 66, 65, 67 filter out the wide band data signals WDs having frequencies F1, F2 and the narrow band signals Ns having frequencies F3, F4 in a similar manner to that described above with respect to the regeneration amplifier 110.

The head end interface 17 also has a voltage sensing and adjusting device, shown generally by reference numeral 200, which senses the DC voltage in the radiating transmission line through the impedance and capacitance filters 210. The voltage sensing and adjusting device 200 is also connected to the linear amplifiers 220a, 220b, 220c, 220d to provide a stable 5 volt DC power current for the amplifiers 220a, 220b, 220c, 220d to amplify the signals WDs, Ns at the specific frequencies F1, F2, F3, F4. The head end interface 17 also comprises an adjustable attenuator 222a, 222b, 222c, 222d for further adjusting characteristics, such as the gain of the narrow band and wide band data signals Ns, WDs.

As illustrated in FIGS. 4A and 4B, at one end, the narrow band signals Ns enter and exit from Port E1 which is connected through a portion of the radiating transmission line 30 to the narrow band head end 13. The narrow band head end 13 will transmit narrow band signals Ns having the third frequency F3 and receive narrow band signals Ns having the fourth frequencies F4. The interface 17, at the same side, is connected to the head end transmit modem 14 through Ports E3, E4. Through ports E3, E4, the head end interface 17 will receive the wide band data signals WDs having the first frequency F1 (through Port E4) and will receive the wide band data signals WDs having the second frequency F2 (through Port E3). At the other end of the head end interface unit 17, all of the data signals Ns, WDs will be combined through combiner 62b. Accordingly, FIGS. 4A and 4B show the connection of the head end interface unit 17, combining the narrow band signals Ns from the narrow band head end 13 and the wide band signals WDs from the modem 14 into the radiating transmission line 30 going below ground 4.

In one embodiment, the linear amplifiers 100 referred to above will have a similar structure to the head end interface 17 illustrated in FIGS. 4A and 4B. In particular, the linear amplifiers 100 will have filters 64, 66, 65, 67, amplifiers 220, and adjustable attenuators 222 similar to the interface 17. The linear amplifier 100 will also have a voltage sensing device 200 connected to the amplifiers 220. However, the amplifier 100 differs from the interface 17 in that the amplifier 100 will have all of the signals Ns, WDs travelling on the line 30 and, therefore, entering and exiting from ports E1, E2. In other words, there is no need for ports E3, E4 in the linear amplifier 100 because the signals Ns, WDs will be present on the line 30 entering port E1. Likewise, the combiner splitter 62a is connected to each of the filters 64a, 66a, 65a, 67a similar to combiner splitter 62b in FIGS. 4A and 4B.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

The embodiments of the invention in which an exclusive property or privilege is claimed are defined as follows:

What is claimed is:

1. A radio frequency communication system for communicating radio frequency data signals containing data to and from remotely located data devices, said system comprising:
   a radiating transmission line;
   a head end unit comprising a system server, said head end unit being coupled to a first end of the radiating transmission line; and
   at least one regeneration amplifier connected to said transmission line for amplifying the data signals by demodulating the data signals to recover the data contained therein and modulating the recovered data into a regenerated radio frequency data signal containing the recovered data, said regeneration amplifier comprising:
      a demodulator for demodulating the data signals to recover the data contained therein;
      a modulator for modulating the recovered data into a regenerated radio frequency data signal containing the recovered data; and
      a processor connected to the modulator and demodulator for receiving the recovered data from the demodulator and performing error detection and correction functions on the recovered data prior to modulating the recovered data,
   wherein the regenerated data signal is transmitted through the radiating transmission line at a power level permitting transmission and radiation of the regenerated radio frequency data signal to the remotely located data devices within a coverage area of the regeneration amplifier.

2. The communication system as defined in claim 1 wherein the regeneration amplifier further comprises: a device for tracking the data devices within the coverage area of the regeneration amplifier; wherein the regeneration amplifier periodically transmits information regarding the data devices within its coverage area to the system server of the base unit to permit the system server to account for delays resulting from the regeneration amplifiers.

3. The communication system as defined in claim 2 wherein each data device in the communication system has a unique address which can be transmitted through the communication system to the regeneration amplifiers; wherein the device for tracking the data devices monitors the unique addresses being transmitted by data devices to track the data devices within the coverage area; and wherein the device to track the data devices periodically transmits the unique addresses of the data devices within the coverage area to the system server to permit the system server to account for delays caused by the regeneration amplifier.

4. The communication system as defined in claim 2 wherein the system server determines a number of regenerations required for a data signal to reach a target data device and for an acknowledgement signal to be received by the system server so that the system server can account for delays caused by each regeneration amplifier when sending radio frequency data signals through the radiating transmission line and awaiting an acknowledgement signal from the data device to which the radio frequency data signals were sent.

5. The communication system as defined in claim 4 wherein the system server comprises a topology of the system and the system server accounts for delays caused by each regeneration by determining the location of the target data device in the topology and calculating the number of regenerations required to send a data signal to the target device and receive an acknowledgement.

6. The communication system as defined in claim 4 wherein the data signals have a frequency of between 2 MHz and 200 MHz and a bandwidth of 0.5 MHz to 32 MHz.

7. The communication system as defined in claim 4 wherein the system server accounts for delays in sending data signals and receiving acknowledgement signals so as to comply with DOCSIS.

8. The communication system as defined in claim 1 wherein the head end unit transmits data signals to the radiating transmission line at a first frequency and receives data signals from the radiating transmission line at a second frequency; wherein the demodulator of each regeneration amplifier comprises a first demodulator for demodulating the radio frequency data signals at the first frequency travelling from the system server, and, a second demodulator for demodulating the data signals at the second frequency travelling towards the system server; and wherein said modulator comprises a first modulator for modulating the recovered data of data signals travelling from the system server into a first regenerated radio frequency data signal having the first frequency and a power level permitting transmission and radiation of the first regenerated radio frequency data signal, and, a second modulator for modulating the recovered data from data signals travelling towards the system server into a second regenerated radio frequency data signal having the second frequency and a power level permitting transmission of the second regenerated radio frequency data signal.

9. The communication system as defined in claim 1 further comprising: at least one linear amplifier connected to said radiating transmission line for amplifying data signals by filtering the data signals and then amplifying the data signals in a direction of travel.

10. In a radio frequency communication system for communicating radio frequency data signals containing data to and from remotely located data devices through a radiating transmission line, a regeneration amplifier for amplifying the digital signals through the radiating transmission line, said regeneration amplifier comprising:
   a demodulator for demodulating the data signals to recover the data contained therein;

a modulator for modulating the recovered data into a regenerated radio frequency data signal containing the recovered data;

an amplifier for amplifying the regenerated data signal for transmission through the radiating transmission line at a power level permitting transmission and radiation of the regenerated radio frequency data signal to the remotely located data devices within a coverage area of the regeneration amplifier; and a processor connected to the modulator and demodulator for receiving said recovered data from the demodulator and performing error detection and correction functions on the recovered data prior to modulating the recovered data.

11. The regeneration amplifier as defined in claim 10 further comprising:

a device for tracking the data devices within the coverage area of the regeneration amplifier;

wherein the regeneration amplifier periodically transmits information regarding the data devices within the coverage area to a system server to permit the system server to account for delays caused by the demodulator, the error detection and correction functions of the processor, and the modulator.

12. The regeneration amplifier as defined in claim 11 wherein each data device in the communication system has a unique address which can be transmitted through the communication system to the regeneration amplifier; wherein the device for tracking the data devices monitors the unique addresses being transmitted by data devices to track the data devices within the coverage area; and wherein the device to track the data devices periodically transmits the unique addresses of the data devices within the coverage area of the regeneration amplifier to the system server to permit the system server to account for delays caused by the regeneration amplifier.

13. The regeneration amplifier as defined in claim 12 wherein each regeneration amplifier within the communication system has a unique address; and wherein the device for tracking the data devices within the coverage area of the regeneration amplifier periodically sends a control signal to the system server containing the unique address of the regeneration amplifier and the unique address of each data device within the coverage area of the regeneration amplifier.

14. The regeneration amplifier as defined in claim 13 wherein the information regarding the devices within the coverage area of each regeneration amplifier is sent to the system server, so that the system server can determine a number of regenerations required for a data signal to reach a target data device and for an acknowledgement signal to be received by the system server from the target device to permit the system server to account for delays caused by the regeneration amplifiers.

15. The regeneration amplifier as defined in claim 11 wherein the radio frequency communication system comprises a head end unit located at a first end of the radiating transmission line, said head end unit being associated with the system server for transmitting data signals to the transmission lines at a first frequency and for receiving the data signals from the radiating transmission line at a second frequency.

16. The regeneration amplifier as defined in claim 11 wherein the demodulator comprises a first demodulator for demodulating the radio frequency data signals at the first frequency travelling from the system server, and, a second demodulator for demodulating the data signals at the second frequency travelling towards the system server; and wherein said modulator comprises a first modulator for modulating the recovered data of data signals travelling from the system server into a first regenerated radio frequency data signal having the first frequency and a power level permitting transmission and radiation of the first regenerated radio frequency data signal, and, a second modulator for modulating the recovered data from data signals travelling towards the system server into a second regenerated radio frequency data signal having the second frequency and a power level permitting transmission of the second regenerated radio frequency data signal.

17. The regeneration amplifier as defined in claim 16 further comprising first bandpass filters connected between the first demodulator and the radiating transmission line and between the first modulator and the radiating transmission line for filtering the first data signals at the first frequency; and second bandpass filters connected between the second demodulator and the radiating transmission line and between the second modulator and the radiating transmission line for filtering the second data signals at the second frequency.

18. The regeneration amplifier as defined in claim 17 wherein the first radio frequency data signals have a first bandwidth between 0.5 MHz and 32 MHz and the first bandpass filters filter data signals have the first bandwidth at the first frequency.

19. The regeneration amplifier as defined in claim 18 wherein the communication system communicates narrow band signals having a bandwidth of between 10 KHz and 100 KHz at a third frequency travelling away from the head end unit and at a fourth frequency travelling towards the head end unit; wherein the regeneration amplifier further comprises linear amplifiers for amplifying the narrow band frequencies away from the head end unit at the third frequency and towards the head end unit at the fourth frequency; and wherein the regeneration amplifier further comprises third filters located between the linear amplifier and the radiating transmission line for filtering narrow band data signals having the third frequency and fourth filters located between the linear amplifier and the radiating transmission line for filtering narrow band data signals having the fourth frequency.

20. The system as defined in claim 8 wherein the remotely data devices comprise a transceiver for receiving the first regenerated radio frequency data signal radiated by radiating transmission line and for transmitting the second radio frequency data signal to the radiating transmission line.

21. The system as defined in claim 8 wherein the remotely data devices can releasably connect to an interface connected to the radiating transmission for receiving the first regenerated radio frequency data signal from the radiating transmission line and for sending the second radio frequency data signal to the radiating transmission line.

* * * * *